United States Patent [19]
Ying-Chung

[11] Patent Number: 4,709,728
[45] Date of Patent: Dec. 1, 1987

[54] SINGLE-AXIS CONTROL AUTOMATIC FAUCET

[76] Inventor: Chen Ying-Chung, 841 Chung Shan North Rd., Sec. 5, Taipei, Taiwan

[21] Appl. No.: 893,724

[22] Filed: Aug. 6, 1986

[51] Int. Cl.⁴ .......................................... F16K 11/18
[52] U.S. Cl. .................... 137/636.4; 4/623;
  137/597; 137/599; 137/605; 251/129.04
[58] Field of Search .................. 137/636.4, 637.4, 599,
  137/625.41, 625.47, 597; 4/623 X, 304, 313;
  251/129.04

[56] References Cited
U.S. PATENT DOCUMENTS

| Re. 25,920 | 11/1965 | Moen | 137/625.41 X |
|---|---|---|---|
| 1,615,730 | 1/1927 | Vallier | 137/597 X |
| 1,856,458 | 5/1932 | Bentley | 137/605 X |
| 2,949,933 | 8/1960 | Moen | 137/597 X |
| 2,997,062 | 8/1961 | Kozel et al. | 137/599 X |
| 3,151,340 | 10/1964 | Teshima | 251/129.04 X |
| 3,193,846 | 7/1965 | Lefebure | 4/313 X |
| 3,232,308 | 2/1966 | Moen | 137/636.4 X |
| 3,351,095 | 11/1967 | Harvey | 137/636.4 X |
| 3,870,080 | 3/1975 | Landwehr | 137/636.4 X |

FOREIGN PATENT DOCUMENTS 21957 1/1981 European Pat. Off. ......... 137/636.4

Primary Examiner—Martin P. Schwadron
Assistant Examiner—Stephen M. Hepperle
Attorney, Agent, or Firm—Burns, Doane, Swecker & Mathis

[57] ABSTRACT

A faucet having an infrared sensor-actuated adjustable valve for automatic control of the discharge of water in response to the user's hands being positioned below the discharge spout. The infrared sensor is activated to control a solenoid valve thereinside. A manual valve mechanism is also provided for effecting a discharge of water by manual control of a single-axis stem during periods when the sensor is inoperative. The temperature of the water discharge created by actuation of either the automatic valve or the manual valve is established by rotation of the stem.

2 Claims, 8 Drawing Figures

SINGLE-AXIS CONTROL AUTOMATIC FAUCET

FIELD OF THE INVENTION

The present invention relates to an ultrared influence type cold/hot water adjustable automatic faucet, and more partucularly, to a faucet capable of attaining an automatic control of water supply normally when the user stretches out his hand to under the water outlet thereof so that the ultrared sensor is influenced and activated to control the magnetic valve disposed therein; and capable of attaining the control of water supply by the manual control vertically of the single-axis stem during the interruption of service or under the normal condition of power supply when the user needs longer time for the supply or storage of water, or the user must absent himself therefrom temporarily while continuing the water supply; and again, capable of adjusting the ultrared sensing cold/hot water adjustable valve (the faucet) for controlling the water temperature by rotational operation of the same single-axis stem under the condition of manual or automatic or both operations.

PRIOR ART

Generally products of the photoelectric cold/hot water faucets or automatic faucets are known to be available in the market. Although all of these faucets discharge water for use automatically when the user has stretched out his hand beneath the faucet, and will terminate flow automatically when the user has finished with the water and has withdrawn his hand from under the faucet. Hence, with such a faucet the user does not have to manually operate the control switch, and as such, this prior art faucet can be said as practically useful and convenient in use. However, in order to avoid there being no water supply with the kind of faucet when power supply is interrupted, it would be better still if an extra switch for use during the power interruption is added. That will however render the faucet parts already complicated in construction even more complicated, which in turn may give rise to troubles. If, however, the quality of water is not up to the mark or the water supply pipe has worn out, after each water supply particles in water and in the pipe will form sediment easily in the complicated parts of the faucet causing trouble or blockage to the faucet easily and which will amount to an increase in the maintaining cost and resulting in a sanitary problem. In addition, such a switching arrangement includes two switches provided for operation during interruption of service and for adjustment of water temperature, the use of which will require a selection of the switch to be made for a particular purpose and this will only add discomfort and inconvenience to the uses thereof. Besides, since the inner parts of the faucet includes relatively more friction members, these members having been used for some time tend to get damaged more easily thereby resulting in a leakage of the faucet. Furthermore, the complication in construction and the inconvenience in assembly will also result in an increase in the cost of production of the faucet.

SUMMARY OF THE INVENTION

Accordingly, an object of the present invention is to provide a single-axis control automatic faucet capable of both controlling the release of water and further adjusting the water temperature by the manual operation of a singleaxis stem switch under whatever condition when there is power supply or during the interruption of service; and of discharging water continuously by simple action of pressing down of the same switch when a supply of a large volume of water over a long period is required, the faucet being convenient to operate and in which when water is being released therefrom the user may concurrently occupy himself with other jobs or he may even absent himself temporarily from the spot.

A further object of the present invention is to provide a single-axis control automatic faucet, both manual control in the release of water therefrom and adjustment in water temperature therein being accomplished by moving vertically as well as rotating in either way of the single-axis control stem.

A further object of the present invention is to provide a single-axis control faucet the construction of which is simple thereby simplifying manufacture and assembly, and in which when the quality of water is not up to the mark resulting in a blockage to the valve mechanism by disparate particles or filth with attendant lessening in the volume of water supply and trouble therein, the control stem is capable of being disassembled easily for cleansing thereby rendering it possible for a lessening in the maintenance cost and for maintenance thereof in a hygienic condition.

Another object of the present invention is to provide a single-axis control automatic faucet having relatively few friction members in the mechanism thereof, in which the sealing effect is perfect whereby any leakage can thus be avoided and the lifetime thereof can be enhanced.

BRIEF DESCRIPTION OF THE DRAWINGS

Other objects and features of the present invention will become apparent from the following description of a preferred embodiment thereof in connection with the accompanying drawings in which.

DETAILED DESCRIPTION OF THE INVENTION

Figure 1:
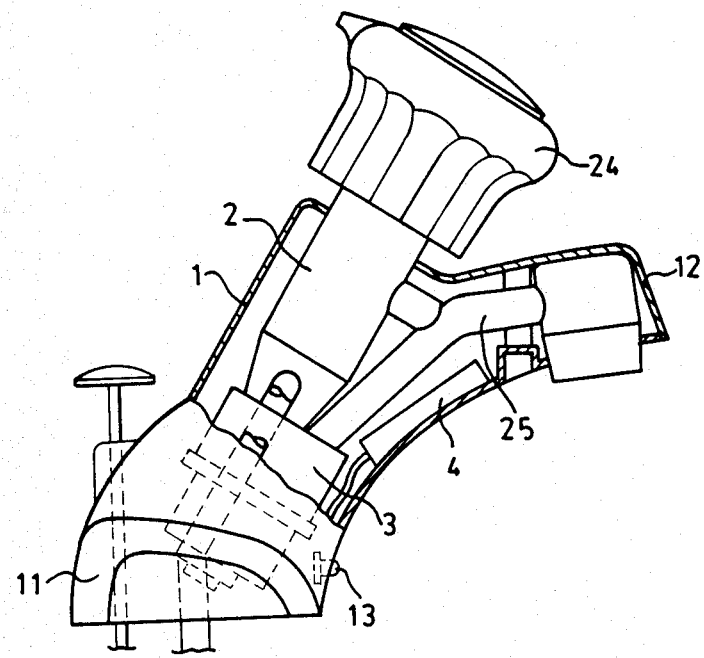
FIG. 1 is a side elevational view of one embodiment of a faucet in accordance with the invention.

Referring to FIG. 1, the single-axis control automatic faucet comprises mainly a valve casing (main body) 1, a main valve 2 accommodated in the valve casing 1 and a magnetic or solenoid valve 3 located at the lower side of the main valve 2. The valve casing 1 includes a slightly flat fitting base 11, an outlet pipe 12 obliquely forwardly projecting out from the center of this base 11, an infrared sensor 13 disposed at the lower side of the outlet pipe 12 and a PC board 4 mounted on the inside of the valve casing 1 and connected to the aforesaid infrared sensor 13 for turn-off control of the magnetic valve 3.

Figure 2:
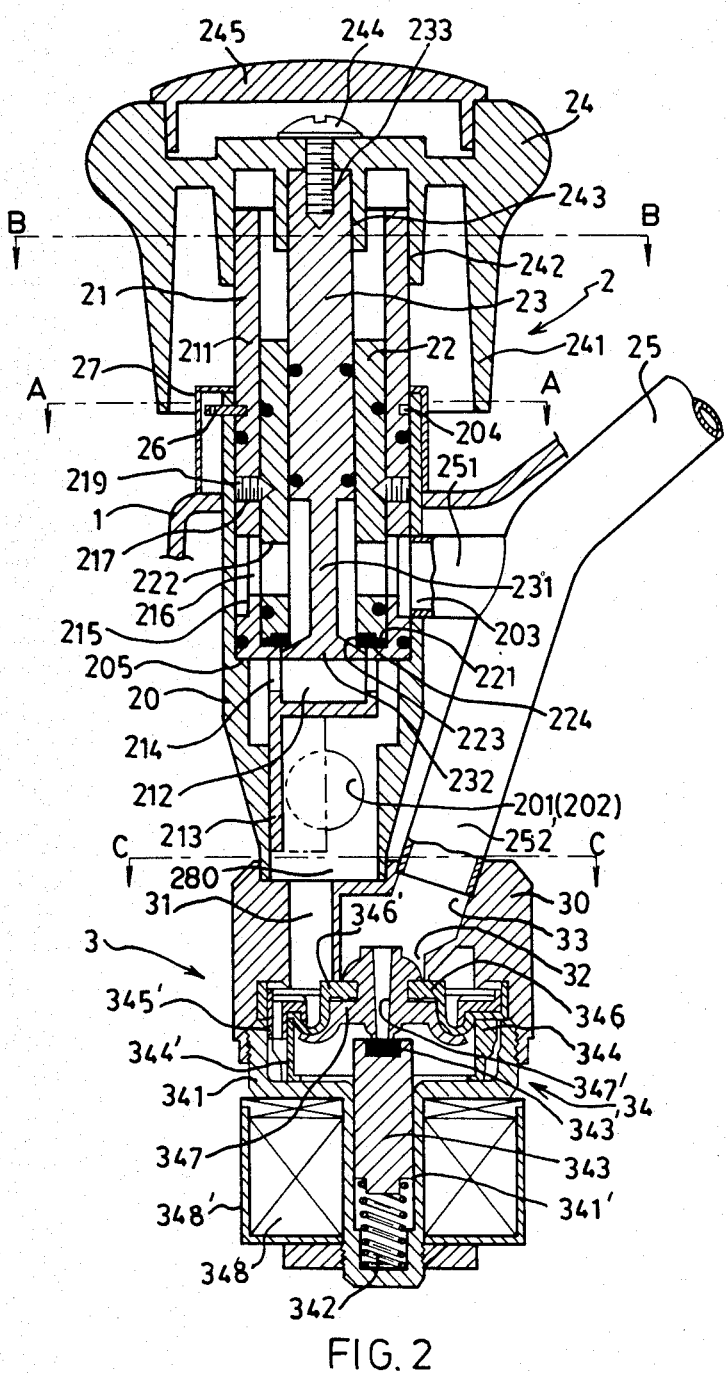
FIG. 2 is a longitudinal sectional view of a main valve

As shown in FIG. 2, the main valve 2 comprises a valve body 20, an outer adjusting cylinder 21 placed inside the valve body 20, an inner cylinder member 22, a control stem 23 inserted in the inner cylinder 22, a manually-operated knob 24 mounted at the top end of the control stem 23 and an outlet pipe 25 provided with the intake end of a branch pipe.

The above-mentioned valve body 20 is a cylindrical body having the lower portion being slightly conical in shape and opening at both the upper and lower parts, the two lateral walls at the conical end thereof being formed with opposedly disposed intake ports 201, 202 with same caliber for cold and hot waters respectively. The lower axial end of the body 20 defines a water outlet 208. The cylinder portion of the valve body 20 is next provided at the center of the front face thereof with a side water outlet port 203 for connection with the aforesaid outlet pipe 25, while a pair of diametrically opposed and circumferentically extended locking slots 204 is being defined in the front and rear walls at the upper end portion thereof. In addition, a shoulder portion 205 as the supporting seat of the adjusting cylinder is formed on the circumferential wall of the valve body 20.

Figure 3:
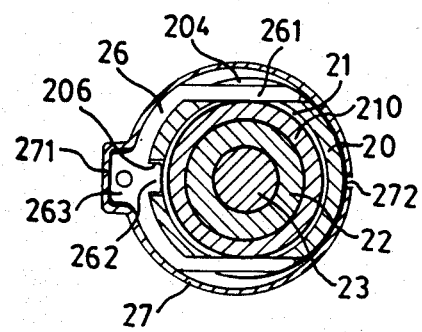
FIG. 3 is a sectional view of the faucet taken along the line B—B ofFIG. 2.

The adjusting cylinder 21 is a cylindrical body including an upper portion shaped as a cylinder member 211 and a lower portion having a semi-circular adjustment sheet 213. As shown in FIG. 3, this adjusting cylinder 21 by means of a check ring or retainer 26 passing through the two opposed locking slots 204 on the valve body 20 and locking in the retaining annular groove 210 provided at the upper portion of the cylinder 21 is capable of rotation relative to the valve body 20. This check ring 26 has projections 262, 263 formed respectively on the inner and the outer sides thereof, the inner projection 262 thereof being engaged in the locking slot 206 on the peripheral wall of the valve body 20 such that the adjusting cylinder 21 will not be axially pulled up while being supported in the valve body 20. In the so-positioned adjusting cylinder 21, the upper end thereof will be projected out of the upper portion of the valve body 20 while the adjustment sheet 213 at the lower end thereof extends into the opening at the lower part of the valve body 20. In this way the adjusting cylinder 21 is capable of being selectively openable and closable entirely or partially in relation to the cold water, hot water intakes 201, 202. The portion of the adjusting cylinder extending between the cylinder body 211 and the adjustment sheet 213 is configured as a valve chamber 212 having a cylindrical bottom in contracted diameter Defined in the front and the rear circumferential walls of this connecting portion are a pair of diametrically opposed and circumferentially extended through holes 214 leading from the valve chamber 212 to the interior cavity of the valve body 20. Furthermore, a pair of diametrically opposed round holes 216 is next defined in the circumferential walls of the second contracted diameter portion of the cylinder body 211 located at the upper side of the valve chamber 212 and a pair of diametrically opposed screw holes 217 is provided on the circumferential walls of the cylinder body 211 located at slightly the upper side of those round holes 216. In this way, the adjusting cylinder 21 so constituted maintains through the intermediary of the two upper and lower water check rings tightly inserted in the upper and lower annular recesses on the outer circumferential wall thereof a water-tight contact with the inner circumferential wall of the valve body 20. In addition, the adjusting cylinder 211 is provided on the outer surface at the upper end thereof with a pair of surfaced flat face portions 24 for a fitting-up of the knob 24.

The inner cylinder member 22 is a cylindrical body having at the lower end a step flange 221 and a pair of round holes 222 which overlap and are in alignment with the pair of round holes 216 of the aforesaid adjusting cylinder 21 being defined in the circumferential wall of the lower end thereof. This inner cylinder member 22 maintains through the intermediary of the two upper and lower water check rings tightly inserted in the upper and lower annular recesses on the outer circumferential wall thereof a water-tight contact with the inner circumferential wall of the adjusting cylinder 21. By means of a pair of countersunk screws 219 retained into the inner cylinder member 22 through the above-mentioned screw holes 217, the inner cylinder member 22 joins with the adjusting cylinder 21 to form a single body. Next, there is fitted tightly between the step flange 221 and the supporting seat 205 a rubber (or elastic material)annular valve seat 224 having a valve port 223 formed in the center thereof.

The control stem 23 is a vertically movable multi-stage round rod structure inserted in the inner cylinder member, and has at the lower end thereof an expanded umbrella-shaped plate valve 232 which normally seals the aforesaid valve port 223 in the valve seat 224. Connected to the upper end of the valve 232 is a narrow-diametered lower axis portion 231, the upper end of which is formed into a larger-diametered upper axis portion appropriately slidably inserted in the inner cylinder member 22. This upper axis portion maintains through the intermediary of the two water check rings tightly inserted in the two annular recesses on the outer circumferential wall thereof a water-tight contact with the inner circumferential wall of the inner cylinder member 22. In the uppermost end of the control stem 23 is provided at the center thereof a screw hole 233, and this end portion is next provided on the circumferential face thereof with two diametrically opposed and parallel flat faces 234 to facilitate the mounting of the rotating knob 24.

Figure 4:
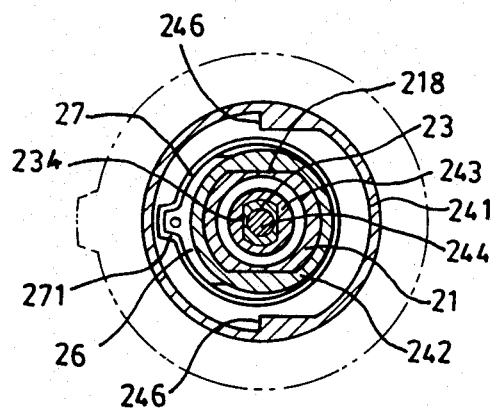
FIG. 4 is a sectional view of the faucet taken along the line C—C of FIG. 2.

The manually-operated knob 24 is a rotating switch having a concave top wall and extending downward from the lower side of this top wall an outer, an intermediate and an inner cylinders 241, 242, 243. A considerably large space is left in the outermost cylinder 241 between the inner circumterential face thereof and the outer circumferential face of the valve body 20. The intermediate cylinder 242 and innermost cylinder 243 are fitted respectively on the outer circumference at the top end of the adjusting cylinder 21 and the control stem 23. The knob 24 is secured to the control stem 23 and together form into a single body by means of a screw passing into the screw hole 233 of the control stem 23 through the top wall of the latter, and on the top face of this knob 24 is next fitted a circular cap 245 to cover the head of screw 244 which is projected out on the top. There are formed on the inner circumferential wall of the outermost cylinder 241 membioned above two raised portions 246, which serve to limit the rotation range (angle) of the knob 24 (see in FIG. 4).

In order to prevent the check ring 26 from falling off or being pulled out inadvertently, the valve body 20, as shown in FIG. 3, has mounted at the upper end thereon a collar 27 having on the circumference thereof an outwardly projected axial projecting portion 271 and a slender axial slot 272, thereby permitting the outwardly projected head 263 of the check ring 26 to be hidden in the cavity formed inside said projecting portion 271. During the rotation of the knob 24, this projecting portion 271 can be stopped at one of the two raised portions 246 to limit the rotational angle of the knob 24 in either way.

The magnetic valve 3 includes a valve body 30 welded to the circumferential edges of the opening at the lower end of the main valve 2 mentioned before and downwardly extending therefrom and having a through hole 31 being in communication with the opening at the lower end of said main valve 2 and an outlet port 33 which communicates through the intermediary of an valve port 32 with that through hole 31, and a magnetic member 34 mounted at the lower portion of said valve body 30.

Figure 5:
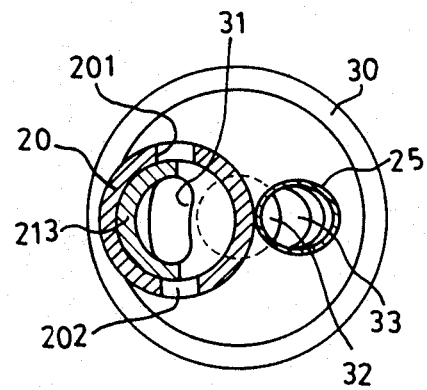
FIG. 5 is a sectional view of the faucet taken along the line A—A of FIG. 2.

The magnetic member 34, shown in FIGS. 2 and 5, comprises a bottom shell 341 sealing up the opening at the lower end of the valve body 30 and having at the center thereof a downwardly extended shaft tube 341' which closes at the terminal end thereof. A plunger 343 slides axially in the shaft tube 341' and is fitted in the front end with a rubber pad 343'. A spring 342 is disposed in the aforesaid shaft tube 341' and generally biases the plunger 343 upwardly. An open-bottom cylinder 344 housed in the bottom shell 341 has a semicircular recess 344' formed on the circumferential wall. A a ring disk 345 has at the outer circumferential edge portion a downwardly projected water service pipe 345' extending into said recess 344'. A rubber valve 346 is clamped between the aforesaid open-bottom cylinder 344 and the ring disk 345 and has at the central part thereof an upwardly raised disk portion 346' appropriately closing up the above-mentioned valve port 32 and having at the circumferential edge thereof a downwardly depressed ring groove. A valve supporting member 347 is disposed between said rubber valve 346 and aforesaid plunger 343 for supporting the rubber valve 346 and has at the center a central water outlet hole 347'. A magnetic coil 348 surrounds the shaft tube 341' beneath the bottom shell 341 and has a water proof casing 348'.

The outlet pipe 25 is a slightly inverted Y-shaped branch manifold joined at the middle and the lower end portion respectively to upper and lower portions 251, 252 of the intake pipe. The end of the lower intake pipe 252 is connected to a water outlet 33 of the magnetic valve 3, while the end of the upper intake pipe 251 is connected to the water outlet 203 of the valve body 20.

Figure 6:
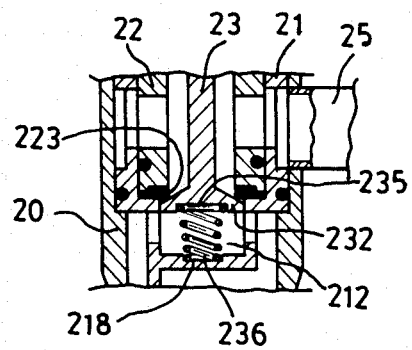
FIG. 6 is a partial sectional view of another embodiment of a control stem portion according to the invention.

In another embodiment of the present invention, as shown in FIG. 6, the circular plate valve 232 at the lower end of the control stem 23 may again be formed on the bottom thereof with a circular recess 235, in which is mounted a weak tension spring 236 to facilitate the tight closing of the valve port 223 by the valve 232. However, when the control stem is being pressed down to unclose the valve port 223, this spring 236 will contract and will also be subjected to the frictional resistance from water check rings as well as the water pressure from above the valve 232 thereby maintaining the valve port 223 in the open condition.

The foregoing are a description on the construction of a faucet of the present invention, the use and working condition of the faucet will be dealt with next in detail in the following.

Figure 8:
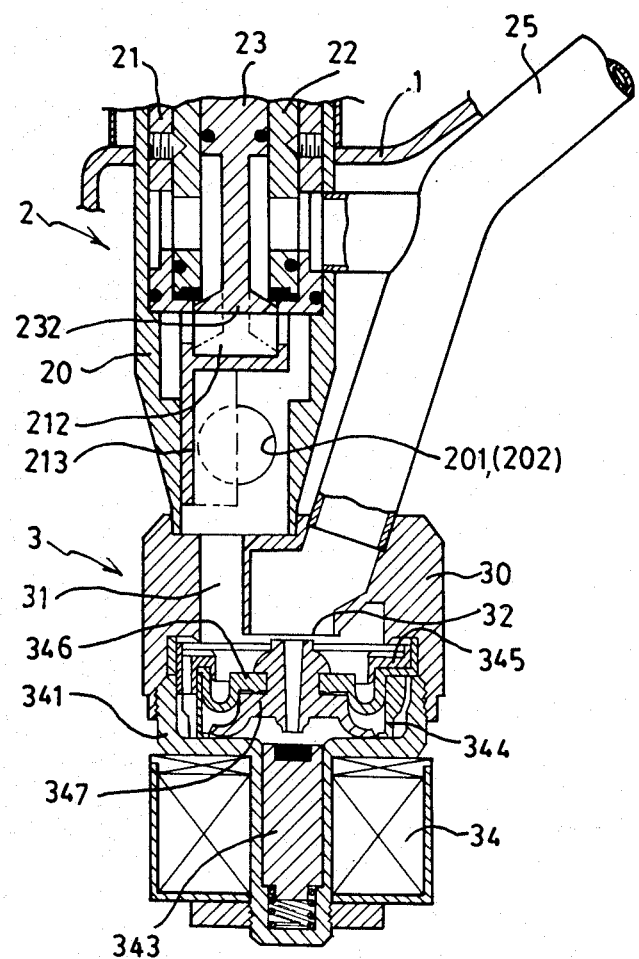
FIG. 8 is a sectional view showing the magnetic valve of the present invention in the opened condition.

Normally, when the faucet is not working, the valve port 32 is closed by the rubber valve 346 of the magnetic valve 3 urged up by the plunger 343 as depicted in FIG. 2, and at the same time, the valve port 223 is closed by the valve 232 of the main valve 2. Under this condition, when the user stretches out his hand to under the outlet pipe 12 of the faucet, as a result of an influence in the infrared sensor 13 the magnetic valve 3 will be electrically energized and activated, whereby the plunger 343 is lowered down permitting the water outlet 347' of the valve supporting member 347 to be opened up at its lower end (see FIG. 8). In this way, when the valve port 32 has been opened up, water released from the cold and hot water intakes 201, 202 will be continuously flowing out from the outlet pipe 25 via the through hole 31, valve port 32 and water outlet 33. Next when the user has finished with the water and withdrawn his hand from the faucet, as a result of the action in the infrared sensor 13 the magnetic valve 3 will cease its action at once, whereby the plunger 343 due to the force of the spring 342 and through the intermediary of the supporting member 347 will push the rubber valve 346 upward and close the valve port 32 once again. At the same time, by the pressure of the water that is being released into the cylinder 344, this plunger 343 will also move the valve 346 to closely seal up the valve port 32 so that water will no longer flow out.

Figure 7:
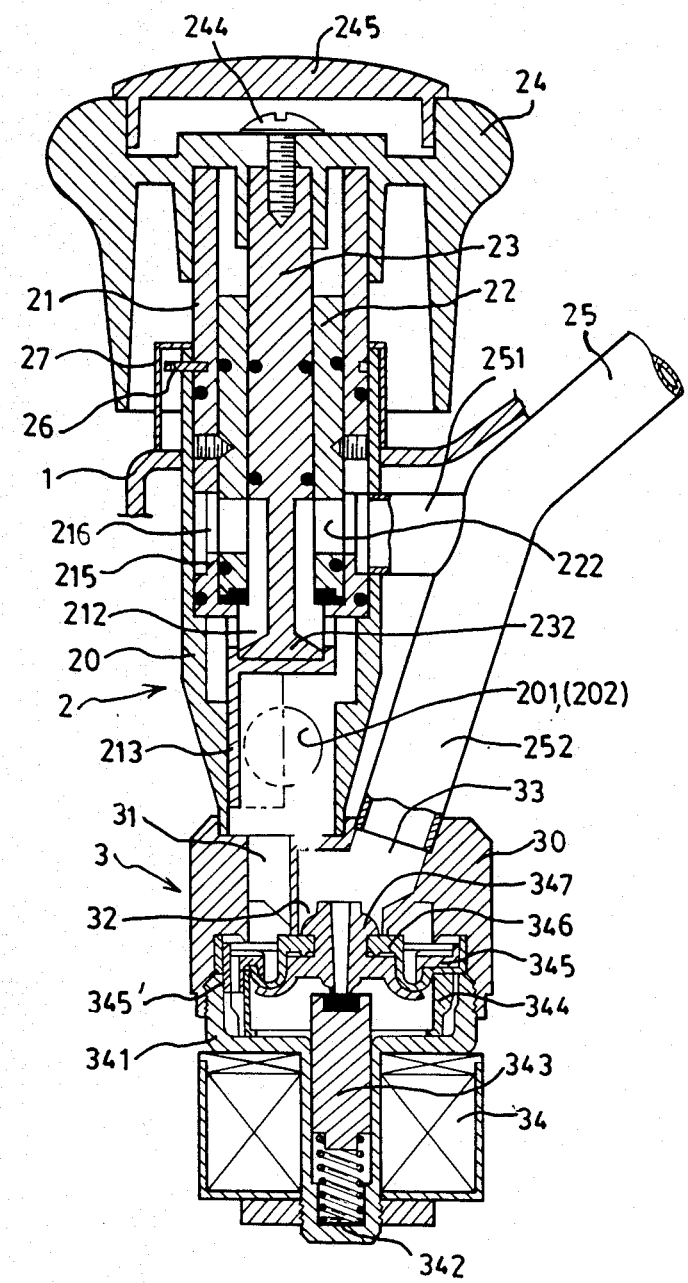
FIG. 7 is a sectional view of the faucet in FIG. 2 showing the manually-operated handle in the closed position.

In the event of a power interruption whereby the magnetic valve 3 is incapable of automatically unclosing the valve port 32, this can be changed to a manual operation by pressing down the manually-operated knob 24. When this knob 24 is pressed down, that is, in the fashion as shown in FIG. 7, the control stem 23 together with the valve 232 will lower down and, as the valve port 223 is thus opened, water which is being discharged into the valve body 20 from the cold and hot water intakes 201, 202 will flow out from the outlet pipe 25 via the through hole 214, the valve chamber 212, the round holes 222, 216 and the water outlet 203. Under this condition, unless the switch knob 24 is pulled up by hand to the position where the valve 232 will again close the valve port 223 water will flow out continuously. Usually when there is a need for supply or store of a large volume of water over a longer time, even under the normal condition of power supply the user may likewise press down the switch knob 24 to allow water flow out uninterruptedly; when supply of water is to be stopped, all that is required to do is to pull up the switch knob 24. Again, under the normal condition of power supply and the condition that the switch knob 24 has been pressed down, when one's hand is stretched out under the faucet and the supply of water, because the magnetic valve 3 is still working water discharged along two routes from the upper and lower intake pipes 251, 252 now will flow out both through the outlet pipe 25 simultaneously. After one has finished with the water and withdrawn his hand, the magnetic valve 3 will automatically close up the lower valve port 32, whereas closing in the upper valve port 223 will require further the pulling-up of the switch knob 24.

In addition, the above illustration which shows the application of the faucet of the present invention has sofar been based on the condition in which cold and hot water intakes 201, 202 are each half turned on, that is, in a condition wherein both cold and hot waters are released in the same volume into the valve body 20 and there the two waters gather together to become mild in temperature. However, when one desires to adjust the temperature of the water or to use either the cold or hot water only, all that is required to do is to rotate the switch knob 24 in one or the other direction. The adjusting cylinder 21 together with the inner cylinder member 22 and the control stem 23 will form a single body and will in turn rotate in one or the other direction, thereby allowing the opening of either the cold or hot water intakes 201, 202 to be increased while the opening of the other intakes 201, 202 being decreased relatively through to the condition that the opening of one water intake is opened entirely while the opening of the other water intake being entirely closed. In this way, it is possible to independently adjust the water temperature, and even to close either the cold water intake 201 or the hot water intake 202 and to supply the hot or the cold water only. During the rotation, because of the locking relation between the raised portion 246 formed on the inner wall of the switch knob 24 and the axial projecting portion 271 of the collar 27 the switch knob 24 can move within the angular range so designated.

Again, if in the faucet the volume of water discharged becomes smaller or there is even a blockage as a result of the sediment of disparate particles being formed thereinside which requires cleansing, or that the water check ring or the rubber member which has worn out requires a replacement, this can be done by removing the collar 27 from the faucet and pulling out the check ring 26. The entire valve assembly including the adjusting cylinder 21, the inner cylinder member 22, the control stem 23 and the switch knob 24 can then be pulled out from above the valve body 20 easily to facilitate the repairing, replacement or cleansing. Especially, since this disassembling work requires no particular skill, whoever else can accomplish the job without difficulty and such that the faucet of the present invention can be a great convenience and can also be kept sanitary.

Following the construction as illustrated above, the faucet of the present invention is not only capable of controlling the discharge of water automatically by means of the magnetic valve, but when it is necessary or when power supply is interrupted, by means of a single-axis control switch only the control of the release of water and even the adjustment of the water temperature as well. Furthermore, when water discharged becomes less in volume or there is a trouble with the faucet as a result of the blockage of particles, dirt or filthy matters thereinside, this faucet can be easily disassembled for cleansing and maintenance, and by being so can be kept sanitary and with which there will be saving in the cost of repair and maintenance.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

I claim:

1. A single axis water faucet for selectively discharging water automatically and manually, said faucet comprising:
   (A) a manually actuable valve comprising:
   (1) a cylindrical main valve body including:
   (i) diametrically opposed hot water and cold water inlets,
   (ii) a first water outlet at a first longitudinal end of said main valve body, and
   (iii) a side water outlet spaced longitudinally from said first outlet, and
   (2) adjusting cylinder means rotatably housed in said main valve body and comprising cylindrical wall means, said adjusting cylinder means including:
   (i) a curved adjusting valve plate disposed at one longitudinal end of said adjusting cylinder means in overlying relationship to said hot and cold water inlets and arranged to be rotated along with said adjusting cylinder means to adjust the relative sizes of said hot water and old water inlets,
   (ii) a hole formed in said cylindrical wall and arranged for alignment with said side water outlet of said main valve body,
   (iii) a valve port for communicating said hot and cold water inlets with said hole to discharge water through said side water outlet,
   (iv) removable retaining means for rotatably mounting said adjustable cylinder means to said main valve body,
   (v) a manually actuable control stem longitudinally slidably disposed in said adjusting cylinder means and including a control rod and a valve plate disposed at one longitudinal end of said valve rod for closing and opening said valve port to control communication between said side water outlet and said cold and hot water inlets in response to longitudinal sliding movement of said valve stem relative to said adjusting cylinder means, and
   (vi) a control knob operably connected to said valve stem and said adjusting cylinder means for effecting longitudinal movement of the former and rotation of the latter,
   (3) said adjustable cylinder means, said control stem, and said control knob being removable as a unit from said main valve body in response to removal of said removable fastening means,
   (B) an additional water outlet port communicating with said cold and hot water inlets through said first water outlet of said main valve body,
   (C) a solenoid valve arranged for opening and closing said additional water outlet port,
   (D) infrared sensing means for opening said solenoid valve in response to sensing a user's hand in a predetermined location, to discharge water through said additional water outlet port, and
   (E) a water discharge pipe including two intake portions communicating with said side water outlet and said additional water outlet port, respectively, and a common discharge outlet commnicating with both said intake portions.

2. A faucet according to claim 1, wherein said retaining means comprises a check ring mounted in aligned slots in said main valve body and said adjusting cylinder means, a collar surrounding said check ring.

* * * * *